P. M. REISIK.
HOSE COUPLING.
APPLICATION FILED SEPT. 12, 1911.
1,031,587.
Patented July 2, 1912.
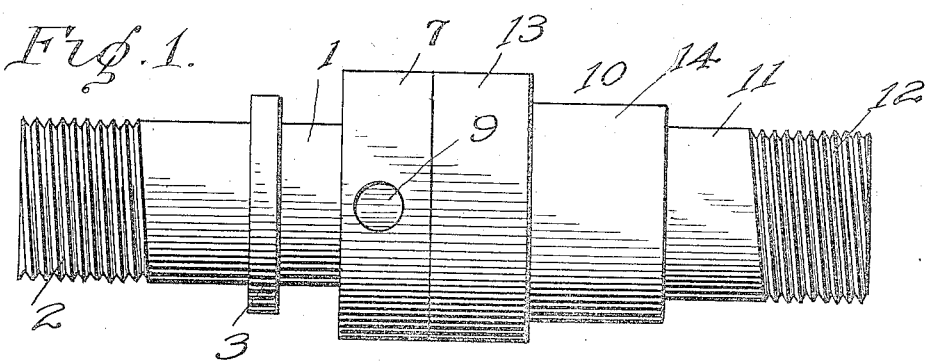
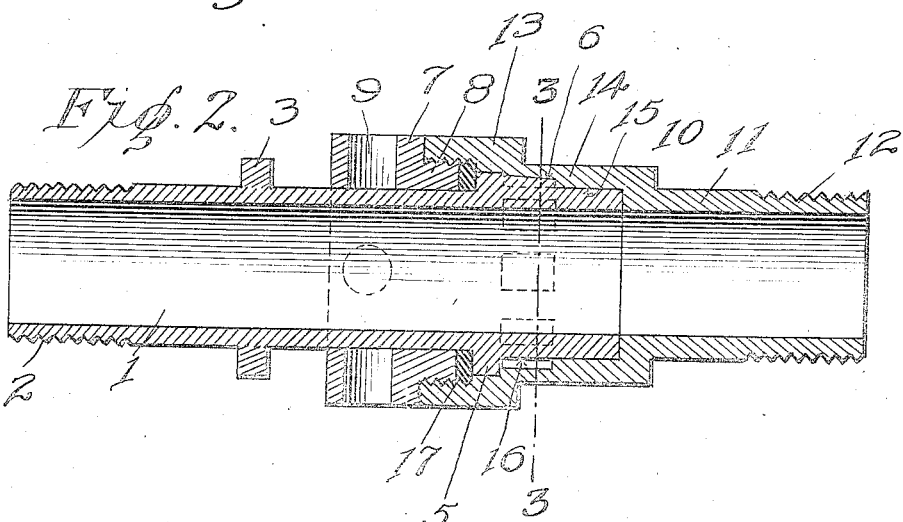
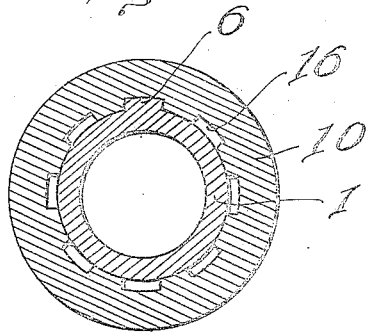
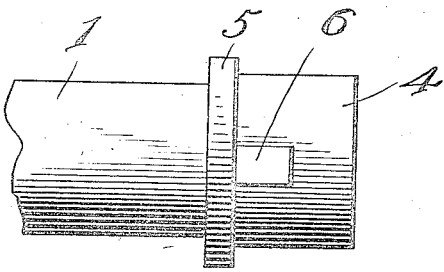
WITNESSES
Howard F. Costello
Irv. L. McCathran
Peder M. Reisik INVENTOR
By E. E. Vrooman
Attorney

UNITED STATES PATENT OFFICE.

PEDER M. REISIK, OF BROOKLYN, NEW YORK.

HOSE-COUPLING.

1,031,587.  Specification of Letters Patent.  Patented July 2, 1912.

Application filed September 12, 1911. Serial No. 648,873.

*To all whom it may concern:*

Be it known that I, PEDER M. REISIK, a citizen of Russia, residing at Brooklyn, in the county of Kings and State of New York, have invented certain new and useful Improvements in Hose-Couplings, of which the following is a specification, reference being had therein to the accompanying drawing.

This invention relates to hose couplers or pipe couplers and has for its object the production of a simple and efficient device which may be cheaply manufactured.

Another object of this invention is the production of a hose coupler which may be placed in position, and will not have a tendency to unscrew from the pipe line or hose line while being tightened together.

With these and other objects in view this invention consists of certain novel constructions, combinations, and arrangements of parts as will be hereinafter fully described and claimed.

In the drawings: Figure 1 is a side elevation of the hose coupler. Fig. 2 is a longitudinal section thereof. Fig. 3 is a section taken on line 3—3 of Fig. 2. Fig. 4 is a fragmentary plan view of the primary section of the hose coupler.

Referring to the accompanying drawings by numerals 1 designates the primary section which is preferably threaded at its outer end as at 2 and is provided with a collar 3 which collar may be secured to the primary member 1 by welding or in any other desired manner. The inner end of the primary section 1 of the hose coupler is enlarged as at 4 and said enlarged portion is provided at its inner end with an integral collar 5. A lug 6 is formed upon the outer face of the enlarged portion 4 and extends from the flange 5. The lug 6 is provided with a beveled outer face for facilitating the placing of the lug within one of the sockets 16. Owing to this beveled face, the lug 6 will be of less height at its outer end than at its inner end.

A binding collar 7 is placed upon the primary section 1 and is positioned between the flanges 3 and 5. This collar 7 is provided with a reduced threaded portion 8 and the body portion of the collar 7 is provided with a plurality of apertures 9 into which may be inserted a rod or tool for rotating the collar 7 upon the primary section 1.

The auxiliary section 10 of the coupler comprises a reduced portion 11 which is threaded at its outer end as at 12 for engaging the pipe or hose line similar to the threaded portion 2 of the primary section 1, and said auxiliary section 10 of the hose coupling is provided with an enlarged portion 13 at its inner end. The auxiliary section is also provided with a portion 14 which is slightly larger than the portion 11, and slightly smaller than the portion 13. The auxiliary section is provided upon its inner face with a socket 15 which is adapted to receive the forwardly extending portion 4 of the primary section 1. The socket 15 is provided intermediate its ends with a plurality of pockets 16 which pockets receive the lug 6 previously described. The inner end of the auxiliary section is threaded so as to engage the threads of the collar 7 whereby the primary and auxiliary sections may be firmly clamped together. A packing 17 is positioned within the socket 15 and rests against the flange 5 of the primary section. This packing is firmly clamped upon its primary section through the medium of the collar 7.

In view of the fact that the auxiliary section 10 is provided with a number of pockets 16 it is not necessary for the primary section to be placed at any definite position as the primary section may be placed within the auxiliary section without any great care and slightly rotated until the lug 6 comes in contact with one of the pockets 16. The collar 7 is then threaded within the auxiliary section 10 thereby tightly holding the primary and auxiliary sections together.

Having thus described the invention, what I claim is:

A coupler of the class described comprising a primary section, and an auxiliary section, said primary section being provided with a plurality of flanges formed thereon, a collar slidably mounted upon said primary section between said flanges, said flanges being adapted to limit the movement of said collar upon said primary section, said auxiliary section being provided with a plurality of pockets formed upon the inside thereof, said primary section being provided with a lug formed thereon, said lug having its outer face beveled throughout its length, and being of less height at its outer end than at its inner end for facilitating the entrance of said lug into said pockets, said collar being provided with a reduced threaded portion, said auxiliary section being provided with an enlarged threaded portion adapted to receive said threaded portion of said collar, a packing positioned upon said primary section and abutting against one of said flanges, said collar being provided with a plurality of sockets adapted to receive a tool for assisting in the rotation of said collar upon said primary section, said collar being adapted to clamp said packing firmly against said flange of said primary section.

In testimony whereof I hereunto affix my signature in presence of two witnesses.

PEDER M. REISIK.

Witnesses:
ALEXANDER THOMPSON,
WILLIAM LOHRMANN.